Oct. 7, 1947.  E. COHNHOFF  2,428,358
ARTIFICIAL RESIN AND METHOD OF COATING PAPER THEREWITH
Filed Sept. 29, 1942
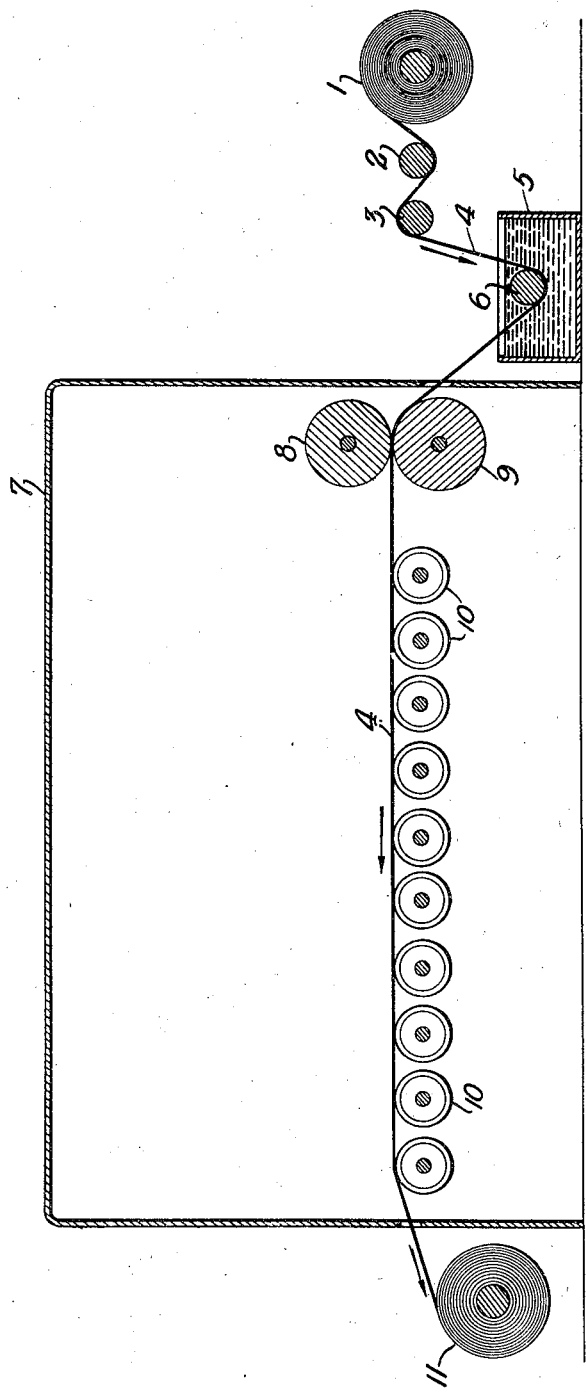
Inventor
Erich Cohnhoff
by Louise O'Neil
Attorney Patented Oct. 7, 1947

2,428,358

UNITED STATES PATENT OFFICE 2,428,358

ARTIFICIAL RESIN AND METHOD OF COATING PAPER THEREWITH

Erich Cohnhoff, Saint Marcelin, France; vested in the Attorney General of the United States Application September 29, 1942, Serial No. 460,147
In France October 29, 1941

2 Claims. (Cl. 117—122)

The invention relates to artificial resins and is described more particularly in connection with artificial resins of aldehydo-phenolic nature.

It is known that resinous products in course of their manufacture pass through three different stages:

The first stage, state A, which follows immediately the condensation of reacting substances corresponds to a viscous fluid formed by a colloidal aqueous solution of resin. This first stage is extremely unstable and tends to be converted into a second stage, state B, corresponding to a solid substance soluble in organic solvents, namely in alcohol.

The third stage, state C, which corresponds to a final and solid form of artificial resin, is obtained by subjecting the second stage to simultaneous action of heat and pressure.

One object of the invention is to eliminate the difficulties encountered in the manufacture of artificial resins due to the impossibility of stopping the reaction of condensation when said reaction has been primed, i. e. to stabilise the state of the product which, in case of aldehydo-phenolic resins corresponds to an aqueous colloidal solution, at the state A.

Another object of the invention is to stop the reaction giving place to the formation of artificial resins by the addition of a stabiliser, such as of tannin, for getting an aqueous colloidal solution of resin which is stable below a certain limit of temperature.

In the particular case of artificial resinous products prepared by condensation of phenols or cresols with aldehydes, this stabilisation enables to get an aqueous aldehydo-phenolic solution either from rectified and purified phenols or cresols, which corresponds to the conventional process used in practice, or what is much more important, in accordance with one of the objects of the invention, by carrying out the reaction, not from purified and rectified phenols or cresols, but from industrial by-products namely from crude coal or wood tar.

The invention can also be applied to the manufacture of artificial resins by ureo-formolic condensation which also enables to stabilise an aqueous colloidal solution at a determined stage.

Another object of the invention is to apply the stabilisation of the resinous product to any reaction of condensation of similar type, whereby the tannin, or any other substance having the same properties, apparently acts as a protector of the colloidal substance in aqueous solution.

The particular interest of this stabilisation, for example in connection with aldehydo-phenolic resins, consists in obtaining an aqueous colloidal solution of any desired degree of viscosity stabilised at the state A, thus enabling to use said resins for new purposes, or in old fields but under more advantageous conditions. In accordance with the foregoing, still another object of the invention is to eliminate in a series of industrial applications the dissolution of resins in organic solvents such as in alcohol, and replacing this alcoholic liquor by a colloidal solution of resin in water.

The invention enables to get any desired degree of viscosity of colloidal aqueous solution of resin either by extraction or by addition of water or of any other suitable solvent.

The stabiliser can, for instance, be used in proportions comprised between 0.5 to 30% depending on the nature of the stabiliser, the substances of reaction and the manufacture of product.

The above objects and other objects of the invention will be apparent from the description of several examples given below with reference to a drawing illustrating one embodiment of carrying out the invention in application to the manufacture of sticking films.

Example I.—Obtention of aqueous colloidal stabilised solution

Crude tar, for instance coal tar, is introduced into a metallic container provided with a double wall space, a mixing device and a heater.

The temperature of the tar is first brought to 40° C., while continuing to mix and when the tar has got a sufficient fluidity there are added for:

| | Parts |
|---|---|
| Coal tar | 100 |
| Formaldehyde (tenor 40%) | 30 |
| Hexamethylenetetramine | 2.7 |
| Ammonia 25° Bé | 1.6 |

The proportion of formaldehyde with respect to the tar is obviously calculated according to the tenor of the tar in phenols.

The temperature of the mass is then brought to about 70° C. while taking necessary precautions in order under no circumstances to exceed this temperature. There are added 2.3 parts of tannin and the mass is mixed in order it becomes and stays completely homogeneous.

The heating is then shut off and a current of cold water is then circulated through the double wall space. When the temperature has dropped to 30° C., the mixing is stopped.

After a certain time, the mass in the container is divided into two layers which can be separated one from the other by decantation.

The upper layer is fluid and is formed by an aqueous solution of aldehydo-phenolic product of condensation at the state A stabilised by the addition of tannin. The lower layer contains all the other substances which arde present in tar coal without the latter having been subject to any transformation with respect to their original state. Only the substances containing a free group OH take part in fact in the reaction of condensation, and the other substances, as stated above, are found in the lower layer.

The substances present in the lower layer (pitch, anthracene, naphthalene, etc.) can be used in the conventional manner.

The upper layer containing the product of aldehydo-phenolic condensation stabilised at the state A in aqueous colloidal solution can afterwards be treated in different manners described more fully hereinafter.

Instead of using the by-products of distillation of coal, there can be used in accordance with the invention pitchy by-products of distillation of wood, containing guaiacol, without having separated the latter. These products will be designated hereunder "crude guaiacol."

*Example II.—Utilisation of the stabilised colloidal aqueous solution for the preparation of moulding powder*

For the preparation of moulding powder the colloidal aqueous solution stabilised at the state A can preferably be treated in the two following manners:

(1°) The colloidal aqueous solution stabilised according to my invention is poured into a container provided with a mixing device and with a heater. The liquid is first brought to a preferably low temperature, for instance to 63° C. under atmospheric pressure, or under vacuum, in order to eliminate the excess of water.

When the mass has got the consistency of a syrup, the temperature is raised up to 100° C., while continuing to mix. This increase of temperature destroys the stabilisation of the colloidal aqueous solution at the state A and causes conversion of the resin to the second stage (state B). The resulting product is then treated in the usual manner.

(2°) This way of operation takes advantage of the property of stability of the colloidal aqueous solution prepared according to my invention.

There are incorporated into the solution in question products with which are artificial resins filled in the conventional manner, for instance: wood flour, textile fibers, fibers of any nature such as mineral fibers, dyes, pigments, etc.

There can also be contemplated the incorportion of new fillers, the use of which would become possible precisely due to the fact that incorporation of the fillers is carried out in aqueous solution, and not to the product at the state B, as it has been practiced until now.

It is pointed out that the fillers used as well as the plastifiers should not destroy the colloidal system of the aldehydo-phenolic solution.

When the additional products have been incorporated at a temperature below 40° C. in the required proportions, the operation is carried out as follows:

The mass is mixed so as to form a mixture as homogeneous as possible in order that the fillers be well impregnated by the aqueous colloidal solution. The mixing is continued constantly while the temperature is slowly raised until there is obtained a substance having the consistency of a syrup.

When the temperature attains 100° C., a conversion of the aqueous solution takes place which is transformed into the sttae B. When this conversion is considered to be sufficient, the mixture is poured into containers, preferably shallow ones, from which after cooling, there are withdrawn plates which after pulverisation provide a moulding powder ready for use.

The advantage of this process with respect to the conventional practice is to suppress the recourse to an expensive equipment required for the incorporation of filling substances to the resin in state B, and to realise an economy of considerable power required for actuation of this equipment.

*Example III—Utilisation of the colloidal aqueous solution for various purposes*

The viscous fluid prepared according to the invention can be advantageously used for the following manufactures:

Insulation varnishes,
    Dye varnishes,
    Impregnation of wood,
    Impregnation of textiles,
    Sticking films, etc.

being expressly understood that the above enumeration is given only as an example and should not be considered in a restricting manner.

According to the prior practice, the resin in state B is used generally in the form of alcoholic solution. The use of these solutions presents numerous drawbacks, the chief of which are the following ones: Inflammability, high cost price on the one hand due to the impossibility of recuperation of the solvent and on the other hand due to the high cost of this recuperation, finally danger due to the action of the alcoholic or other solvent on the material treated thereby.

These drawbacks are eliminated by the use of the colloidal aqueous solution stabilised at the state A in accordance with my invention.

It is pointed out that it is possible to incorporate into this solution all the products, fillers, dyes, pigments, etc., necessary for getting the final products having the properties required for their use, being understood that these products of addition should not destroy the colloidal system of the aqueous solution.

A particularly interesting application of the invention consists in impregnating a support in order to obtain a sticking film. This application is described hereunder:

*Example IV.—Utilisation of the colloidal aqueous solution for the preparation of sticking films*

The process of manufacture of sticking films consists chiefly in impregnating or coating a support, which may preferably be formed by paper, or which can be of any other cellulosic or textile nature, by using as impregnation or coating substance, the colloidal aqueous solution either of aldehydo-phenolic nature, or of any other type, enabling the application of the process of stabilisation according to the invention.

In order to disclose more fully the application of the aqueous colloidal solution stabilised at the state A, one of the following formulae can be used:

(1)

| | |
|---|---|
| Crude guaiacol | 43.75 |
| Formaldehyde (tenor 40%) | 45.16 |
| Hexamethylenetetramine | 5.49 |
| Ammonia 25° Bé | 1.76 |
| Tannin | 3.84 |
| | 100.00 |

(2)

| | |
|---|---|
| Crude cresol or phenol | 42.86 |
| Formaldehyde (tenor 40%) | 46.23 |
| Hexamethylenetetramine | 5.35 |
| Ammonia at 25° Bé | 1.78 |
| Tannin | 3.78 |
| | 100.00 |

(3)

| | |
|---|---|
| Crude cresol or phenol | 42.86 |
| Formaldehyde (tenor 40%) | 48.25 |
| Hexamethylenetetramine | 5.33 |
| Ammonia at 25° Bé | 1.78 |
| Tannin | 1.78 |
| | 100.00 |

In each of the cases corresponding to the three above formulae, the products are treated by the same process as that described in the first example in order to get a colloidal aqueous aldehydo-phenolic solution stabilised at the state A intended for impregnation of the support used for the manufacture of sticking films.

This solution is then used as indicated hereunder:

For obtaining a sticking film on a suitable support it is possible to proceed either in a conventional manner, or preferably there are used certain means adapted for application of a layer of resinous substance other than that described above.

The deposit of the resinous solution is affected by means of a machine the structure of which will appear by referring to the enclosed diagrammatical drawing:

The support 4 wound on a roller 1 passes between rollers 2, 3 and 6 mounted to assist the withdrawal of the support and its passage through a container 5 filled with a resinous solution.

At the exit from the container 5 where takes place the impregnation of the support, which then becomes very frail in case it is formed by paper as for example a paper web, the latter enters into chamber 7 and passes between two rollers 8 and 9 made of wood, fiber, ebony, rubber or any other material with the exception of metal, the aim being to use a substance having a low thermic conductibility, and also having a certain elasticity, so as to avoid the risk of rupture of the film.

The film continuing its travel is supported on its way in the chamber 7 by a series of rollers 10 arranged in succession and heated either individually or by the heat kept in the chamber 7 which is preferably coated with a substance of low thermic conductibilty.

At the exit from the chamber 7, the film which has been the subject of required conversion became dry and solid, and can be wound without any difficulty on the reception roller 11 on which it is stored ready for use.

The temperature in the chamber 7 or of the rollers 10 as well as the speed of progression of the film may be adjusted in such a manner that the conversion of the product of impregnation from the state A to the state B be finished before the exit of the chamber 7. In case of a colloidal solution prepared according to the Example 1, the temperature to be kept is about 96° C., and the speed of progression of the support corresponds to a duration of passage in the chamber 7 of about two minutes.

It is pointed out that the drive of all the rollers should be realised in such a manner that the film is withdrawn at a speed identical in all the parts of the machine in order to avoid a rupture of the support.

A sticking film prepared according to the invention by the use of colloidal aqueous solution stabilised at the state A, and manufactured by means of the machine described above presents a series of advantages, the chief of which are the following ones:

(a) The presence of tannin chosen in this case as a stabiliser, assists the penetration of the glue into the superficial layers of the object to be connected one with the other, particularly in case of wood. The temperature of glueing can therefore be lowered to 102° C., and even less and the time during which it is necessary to apply pressure to said objects can, for instance, be lowered to 9 minutes. It is recalled that in case of glue prepared by means of an aldehydo-phenolic resin at the state B and of a solvent, the temperature should be about 130° C. and the time of applying pressure about 12 minutes.

(b) The use of an aqueous solution eliminates all the drawbacks inherent to high cost and the dangers existing in case of use of alcoholic or similar solutions.

(c) The support of the film formed by suitable cellulosic material disappears in course of the utilisation of the sticking film.

A particularly interesting application of the sticking film consists in the manufacture of plywood of any amount of sheets. A sticking film can be inserted between each sheet of wood and the resulting assembly is subjected to a pressure of about 10 kilos per square centimeter at a temperature of about 102° C. The conditions of pressure and temperature may vary in accordance with the nature of the wood and the result to obtain, the operation being extended to a period of time sufficient to bring, to a suitable temperature, the assembly to be glued.

It is expressly understood that the invention is not limited to the examples described above and that other numerous embodiments will appear to the men skilled in the art within the scope of the invention.

For the manufacture of sticking films the substance enabling a reduction of pressure and a decrease of temperature during the operation of gluing, can be different from the stabiliser used for stopping the aldehydo-phenolic reaction of condensation at a determined stage.

The substances adapted to decrease the pressure and temperature of gluing can also be added to a solution of resin in an organic solvent and which does not include any stabiliser.

What I claim is:

1. In the process for the manufacture of a sticking film, adding together from 42.86 to 43.75% of one of the group of phenols consisting of crude guaiacol, crude cresol and crude phenol, from 45.16 to 48.25% of 40% formaldehyde, from 5.33 to 5.49% of hexamethylene tetramine, from 1.76 to 1.798% 25° Bé. ammonia and tannin in the proportion of 1.78% to 3.84%, bringing this mass to a temperature of about 70° C. not exceeding 70° C., mixing until the mass becomes homogeneous, allowing the temperature to drop to about 30° C. and separating the resulting aqueous colloidal solution of resin.

2. In the process of manufacturing an adhesive web the steps of which comprise impregnating an endless paper web with the aqueous colloidal solution of the resin defined in claim 1 whereby the web becomes very frail, subjecting both sides of the impregnated web to pressure, thereafter applying heat gradually and progressively as the web is advanced in a heating zone, the temperature therein ranging from between 96° C. to 130° C., whereby the web becomes dry and solid as it leaves the zone.

ERICH COHNHOFF.

REFERENCES CITED

The following references are of record in the file of this patent:

UNITED STATES PATENTS

| Number | Name | Date |
|---|---|---|
| 2,242,484 | Schroy et al. | May 20, 1941 |
| 2,297,698 | Freeman | Oct. 6, 1941 |
| 1,987,694 | Mains | Jan. 15, 1935 |
| 2,019,056 | Osgood et al. | Oct. 29, 1935 |
| 1,911,489 | Carlin et al. | May 30, 1933 |
| 1,889,751 | Kessler | Dec. 6, 1932 |
| 1,269,627 | McCoy | June 18, 1918 |
| 1,855,384 | Cheetham | Apr. 26, 1932 |
| 1,223,216 | Talley | Apr. 17, 1917 |
| 1,960,176 | Weber | May 22, 1934 |
| 2,083,423 | Bennett | June 8, 1937 |
| 942,700 | Baekeland | Dec. 7, 1909 |
| 1,370,666 | Novotny | Mar. 8, 1921 |

FOREIGN PATENTS

| Number | Country | Date |
|---|---|---|
| 5,650 | Great Britain | 1899 |

OTHER REFERENCES

Morgan et al., Jour. Soc. Chem. Ind., vol. 50, June 5, 1931, pages 191T–193T.

Glund et al., Gesam. Abhand. Zur Kenntnisderkohle, vol. 4 (1919–20), pages 221–36.

Certificate of Correction

Patent No. 2,428,358.  October 7, 1947.

ERICH COHNHOFF

It is hereby certified that error appears in the printed specification of the above numbered patent requiring correction as follows:

Column 7, line 2, for "1.798%" read *1.78%*;

and that the said Letters Patent should be read with this correction therein that the same may conform to the record of the case in the Patent Office.

Signed and sealed this 14th day of December, A. D. 1948.

[SEAL]

THOMAS F. MURPHY,
*Assistant Commissioner of Patents.*